3,314,295
PRESSURE-RESPONSIVE INDICATOR
William I. Wukovitz, 534 W. 31st St.,
Long Beach, Calif. 90806
Filed July 6, 1965, Ser. No. 469,441
6 Claims. (Cl. 73—419)

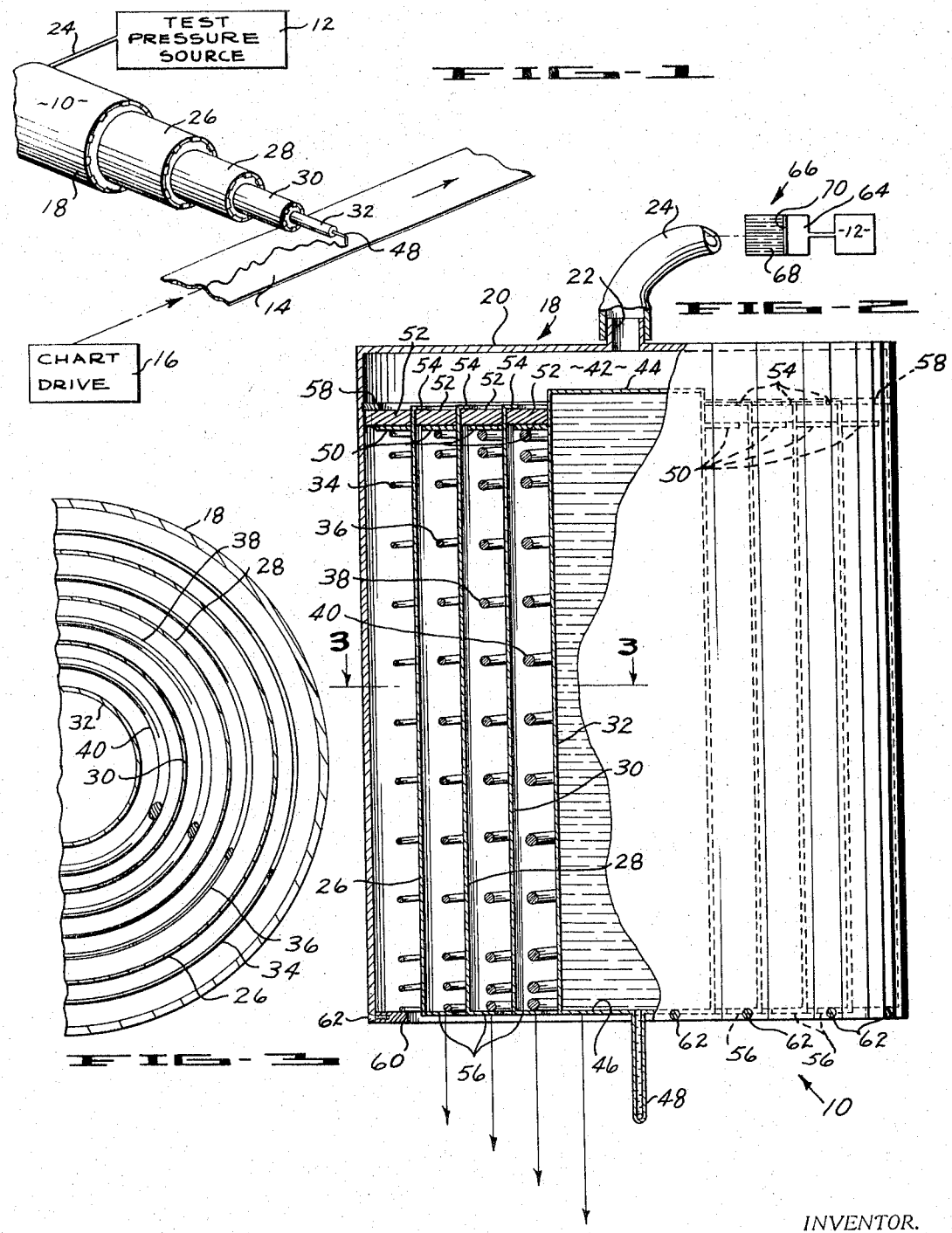

The present invention relates to a pressure-responsive indicator, and more particularly to an indicator responsive to a pressure differential to provide an indication on a moving chart or the like corresponding to the magnitude and character of the pressure differential.

It is an object of the present invention to provide a pressure-responsive indicator which is sufficiently sensitive to relatively low pressures that it is capable of directly converting the sensed pressure into an indication on a moving chart or the like. More particularly, there are a number of systems available in the prior art which are capable of sensing low pressures and thereafter effecting an indication of the magnitude and variation in such pressures. However, most of these devices do not directly convert the low pressures but rely upon some means for amplifying the signal. Thus, in a typical prior art system, a bellows is utilized to sense the pressure differential, and the bellows in turn controls a solenoid, air cylinder or the like connected to a recording pen or stylus. Such a system is obviously comparatively complex and, by reason of the number of operating components, requires periodic adjustment, calibration, and repair of the components. In contrast, the present pressure-responsive indicator utilizes the sensed, relatively low differential pressures to directly actuate the stylus and thereby record the magnitude and character of the pressures sensed.

Another object of the invention is to provide a pressure-responsive indicator which is relatively inexpensive to manufacture, reliable in operation, and characterized by a relatively long service life.

A further object of the invention is the provision of a pressure-responsive indicator which utilizes a plurality of telescopical and extensible pressure sections which are carried within a casing and whose inner ends define a pressure chamber with the casing. A plurality of springs are utilized to urge the pressure sections into their telescoped positions, the springs also serving as the interconnection between the adjacent pressure sections and also between the casing and the pressure section adjacent the casing. With this arrangement, one pressure section is extensible against the bias of its spring until that spring is compressed by a certain amount. Any further increase in the pressure differential tends to effect extension of the next pressure section against the bias of its spring, and so on. The extension of the pressure sections is therefore progressive and corresponds to the increasing pressure differential. The most extensible or most outwardly projected one of the pressure sections carries a marking pen or stylus which is adapted for cooperation with any conventional moving chart to provide an indication on the chart corresponding to the extension and retraction of the pressure sections under the influence of the changing differential pressure in the casing.

Yet another object of the invention is the provision of a pressure-responsive indicator of the aforementioned character in which the casing and the pressure sections are cylindrical in configuration and thereby occupy a minimum of space. The springs utilized are compression springs which are disposed, respectively, within annular spaces defined between the pressure sections and the casing, the spring rates of each of the springs preferably being different to promote progressive extension of the sections under increasing pressure differentials in the casing.

Other objects and features of the invention will become apparent from consideration of the following description taken in connection with the accompanying drawings, in which:

FIG. 1 is a perspective view of the pressure-responsive indicator of the present invention in association with a schematically-indicated test pressure source and a schematically-indicated moving chart and chart drive;

FIG. 2 is an enlarged longitudinal cross-sectional view of the indicator of FIG. 1, the pressure sections being illustrated in their telescoped positions, as compared with the projected positions thereof illustrated in FIG. 1; and FIG. 3 is a partial view taken along the line 3—3 of FIG. 2.

Referring now to the drawings, there is illustrated a pressure-responsive indicator 10 according to the present invention which is adapted for connection to a source of pressure differential or test pressure 12, and which is further adapted for cooperation with a moving chart 14 driven by a chart drive 16. The test pressure source 12 is indicated generally since the nature of the source is relatively immaterial. The present indicator is adapted for use in any situation where pressures are to be indicated or recorded, and the character of the pressure fluid involved is equally immaterial. However, the indicator 10 is particularly well suited for use with a pneumatic system in which the range of test pressures is in the order of 3 to 15 p.s.i., and it is desired to actuate a recording stylus to maintain a continuous record of the magnitude and character of the pressure differentials in the pneumatic system.

The chart 14 is a conventional roll chart comprising a long length of paper drawn from a supply roll and wound upon another roll after the recording is made. The chart drive 16 is any suitable motor means or the like for driving the roll upon which the paper is collected. The indicator 10 is not limited to any particular form of roll chart or drive means, and is, for example, equally adapted for use with a circular chart rotated by a drive means to provide a continuous indication of pressure conditions.

The indicator 10 comprises, generally, a cylindrical casing 18 having a closed inner end 20 and an open outer end, the inner end including an outlet fitting having an opening 22 for connection by a flexible hose 24 to the pressure source 12; a plurality of telescopable cylindrical pressure sections 26, 28, 30 and 32 concentrically or coaxially arranged in spaced-apart relation in the casing 18; and a corresponding plurality of compression springs 34, 36, 38 and 40 arranged in the spaces between the sections and the casing and operative to tend to maintain the pressure sections in the nested or telescoped positions illustrated in FIG. 2.

Although the casing 18 is preferably cylindrical, it may be oblong, rectangular, or any of a variety of configurations. It may be even semi-cylindrical, with the open side of the casing closed by a wall and the pressure sections similarly configured to cooperate therewith. However, the cylindrical configuration is preferred for simplicity of fabrication and operation.

The casing inner end 20 and the upper extremities of the pressure sections 26–32 define a pressure chamber 42 within which the pressure differentials of the pressure source 12 are developed. The pressure differential in the chamber 42, as will be seen, is operative to effect slidable extension of the pressure sections. For this purpose, the inner wall of the casing 18 is smooth and of uniform, transverse cross section, and the same is true of the inner surfaces of the pressure sections 26–30.

The innermost pressure section 32 is an elongated cylinder closed at one end by an inner end wall 44 and at the opposite end by an outer end wall 46, the outer end wall 46 carrying a pen holder or stylus 48 in communication with the hollow interior of the pressure section 32. The stylus 48, as best seen in FIG. 1, includes a curved end portion adapted to engage the surface of the chart 14 in the normal substantially horizontal orientation of the present indicator 10. The interior of the pressure section 32 is filled with a suitable ink or like marking material which feeds through the stylus 48 for deposit upon the chart 14, as will be apparent.

The upper extremity of the pressure section 32 includes an annular flange or upper spring retainer 50 which supports an annular piston portion 52 which forms a part of the pressure section 32.

Each of the remaining pressure sections 26–30 is concentrically arranged about the pressure section 32 in spaced relation therewith, with the casing 18, and with the pressure section 32. This provides a corresponding plurality of annular spring compartments within which are disposed, respectively, the compression springs 34–40. Each of the pressure sections 26–30 also includes an annular flange or spring retainer 50 and a piston portion 52 supported by the associated retainer 50.

The upper edge of each of the pressure sections 26–30 is inwardly bent or deformed to provide a stop 54 to limit movement therepast of the next inwardly adjacent piston portion 52. The lower edge of each pressure section 26–30 is also provided with a plurality of circumferentially spaced, inwardly bent or deformed tabs constituting lower spring retainers 56. The retainers 56 are deformed to the position illustrated after assembly of the pressure sections and springs within the casing 18.

An annular snap ring or stop 58 is seated within an annular groove provided adjacent the upper extremity of the casing 18 to limit upward movement of the adjacent piston portion 52. In addition, the lower extremity of the casing 18 mounts an annular spring retainer 60 which is secured in position by a plurality of screws 62 extending through the casing 18 and the spring retainer 60.

The spring rates of the springs 34–40 are progressively greater so that the lightest spring 34 first begins to compress under the differential pressure, progressively followed by compression of the other springs. In the pneumatic system here used as an example, the spring 34 is selected to undergo initial compression at approximately 3 p.s.i. in the chamber 42 and to be almost completely compressed at approximately 6 p.s.i. The range of the spring 36 is between 6 and 9 p.s.i., the range of the spring 38 is between 9 and 12 p.s.i., and the range of the spring 40 is between 12 and 15 p.s.i. With this arrangement, a build-up of pressure differential in the pressure chamber 42 develops a force against the piston portions 52 and the inner end wall 44 which first compresses the spring 34. As the spring 34 compresses, the pressure section 26 extends or moves downwardly, as best viewed in FIG. 2. The piston portion 52 associated with the pressure section 26 slides in fluid sealing relation upon the adjacent inner surface of the casing 18. As it extends the pressure section 26 carries with it the pressure sections 28–32 by reason of the interengagement of the stops 54 and the adjacent piston portions 52.

Further increase in the pressure differential in the chamber 42 next causes compression of the spring 36 to extend the pressure sections 28–32 beyond the already extended pressure section 26, which is by now stopped by virtue of engagement of its upper retainer 50 with the casing lower retainer 60. Progressive extension of the sections 28–32 continues as the pressure in the pressure chamber 42 builds up and the upper retainers 50 engage the lower retainers 56 of the next outwardly adjacent pressure sections. The completely projected or extended sections are illustrated in FIG. 1. On reduction of the pressure differential, the bias of the springs 34–40 effects progressive retraction of the pressure sections, as will be apparent.

During extension and retraction of the pressure sections, the stylus 48 provides a record or indication on the chart 14 which corresponds to the movements of the pressure sections. Accordingly, the precise character of the variations in pressure differential in the chamber 42 is directly converted by extension and retraction of the pressure sections into a corresponding indication upon the chart 14.

The particular spring rate of the springs is selected according to the particular application, and the same is true of the surface area selected for the piston portions 52. That is, the spring rates and piston areas are predetermined to yield the desired correspondence of movement between the stylus 48 and the pressure conditions existing in the pressure chamber 42.

If desired, instead of applying the low pressure air directly from the test pressure source 12 to the pressure chamber 42, the low pressure air can be directed from the source 12 into an air chamber 64 of an oil reservoir 66. The remainder of the reservoir 66 constitutes an oil chamber 68, the chambers 64 and 68 being separated by a floating piston or flexible diaphragm 70.

The hose 24 can then be used to connect the oil chamber 68 of the reservoir 66 to the pressure chamber 42, and the pressure chamber 42, the hose 24, and the oil reservoir 66 purged of all air so that these elements are completely filled with oil.

With this arrangement, air from the source 12 passes into the air chamber 64 and moves or deflects the diaphragm 70 to the left, as viewed in FIG. 2, displacing oil from the oil chamber 68 and, by virtue of the incompressible nature of the oil, effecting displacement of the pressure sections 26–32. Thus, the air pressure from the source 12 is converted into an oil pressure of like magnitude acting upon the piston portions 52 and the end wall 44. The advantage of this arrangement is that such foreign elements or dirt as may be present in the air from the source 12 are prevented from passing into the interior of the casing 18 and possibly causing a malfunction of the indicator 10. In addition, the oil lubricates the walls of the pressure sections 26–32 upon displacement of these sections, thereby greatly reducing friction between the relatively moving parts of the apparatus.

The reservoir 66 is merely shown diagrammatically, and it will be apparent that the volume of oil in the chamber 68 and in the pressure chamber 42 must be sufficient to fill the upper portion of the casing 18 upon outward displacement or extension of the sections 26–32.

From the foregoing, it is seen that a sensitive pressure-responsive indicator is provided which is adapted to convert the relatively low pressure differentials sensed to a correponding indication upon the chart 14. Mechanism or apparatus for amplifying the sensed pressure in order to move the stylus is completely eliminated. Moreover, the relatively simple construction of the indicator is adapted for manufacture at relatively low cost, and the lack of complex inneraction between the various components is conducive to reliable operation and an extended service life.

Various modifications and changes may be made with regard to the foregoing detailed description without departing from the spirit of the invention or the scope of the following claims.

I claim:
1. A pressure-responsive indicator comprising:
a casing having a closed inner end and an open outer end and including means in said closed end for providing a connection to a source of pressure differential;
a plurality of extensible pressure sections in said casing in spaced relation thereto and in spaced relation to each other to define a plurality of spring compartments between said pressure sections and between said casing and the one of said pressure sections adjacent thereto, said pressure sections each including a piston portion adjacent said inner end and defining a pressure chamber therewith, each said piston portion being slidable in fluid sealing engagement upon the adjacent one of said casing and said pressure sections;

a plurality of springs in said spring compartments, respectively, each engaged at its opposite ends, respectively, upon the adjacent ones of said casing and said pressure sections and exerting a bias tending to maintain said pressure sections in retracted positions relative to said casing whereby said pressure sections are progressively extended upon application of differential pressures to said pressure chamber; and stylus means carried by the most outwardly extensible one of said pressure sections to provide an indication on a moving chart or the like corresponding to the pressure differential in said pressure chamber.

2. A pressure-responsive indicator comprising:

a plurality of telescopable pressure sections having portions interengaged upon extension of said sections to maintain said sections in connected relation;

a plurality of bias means engaged upon adjacent said sections and tending to urge said sections into telescoped relation;

a stylus carried by the most outwardly extensible one of said sections;

a casing mounting said sections and defining a pressure compartment therewith and including means for providing a connection between said compartment and a source of pressure differential whereby said pressure sections are extensible against the bias of said bias means and under the influence of said pressure differential, and said stylus is moved in correspondence with the character and magnitude of the pressure differential in said pressure compartment.

3. A pressure-responsive indicator comprising:

a cylindrical casing having a closed inner end and an open outer end and including means in said closed end for providing a connection to a source of pressure differential;

a plurality of extensible cylindrical pressure sections in said casing spaced to define a plurality of annular and concentrically disposed spring compartments between said pressure sections and between said casing and the one of said pressure sections adjacent thereto, said pressure sections each including a piston portion adjacent said inner end and defining a pressure chamber therewith, each said piston portion being slidable in fluid sealing engagement upon the adjacent one of said casing and said pressure sections;

a plurality of springs in said spring compartments, respectively, each engaged at its opposite ends, respectively, upon the adjacent ones of said casing and said pressure sections and exerting a bias tending to maintain said pressure sections in retracted positions relative to said casing whereby said pressure sections are progressively extended upon application of differential pressure to said pressure chamber; and stylus means carried by the most outwardly extensible one of said pressure sections to provide an indication on a moving chart or the like corresponding to the pressure differential in said pressure chamber.

4. A pressure-responsive indicator according to claim 3 wherein said springs are compression springs characterized by different spring rates.

5. A pressure-responsive indicator comprising:

a plurality of cylindrical pressure sections arranged in concentric and spaced relation for telescoping retraction, said pressure sections having piston portions and spring retainers;

a plurality of compression springs arranged in the annular spaces between said spaced pressure sections, and each engaged at its opposite ends upon the spring retainers, respectively, of an adjacent pair of said pressure sections whereby the same are biased into retracted positions;

a stylus carried by the most outwardly extensible one of said sections;

a casing mounting said sections and defining a pressure compartment therewith and including means for providing a connection between said compartment and a source of pressure differential whereby said pressure sections are extensible against the bias of said springs and under the influence of said pressure differential acting against said piston portions, and said sylus is moved in correspondence with the character and magnitude of the pressure differential in said pressure compartment.

6. A pressure-responsive indicator according to claim 5 wherein said springs are characterized by different spring rates.

No references cited.

RICHARD B. WILKINSON, *Primary Examiner.*

MICHAEL LORCH, *Assistant Examiner.*